United States Patent [19]

Hosokawa et al.

[11] Patent Number: 5,665,796
[45] Date of Patent: Sep. 9, 1997

[54] METHOD FOR THE CONTINUOUS PREPARATION OF ORGANOPOLYSILOXANE EMULSIONS

[75] Inventors: Hidehiko Hosokawa; Junichi Maeshima; Fumitaka Suto, all of Chiba Prefecture, Japan

[73] Assignee: Dow Corning Toray Silicone Co., Ltd., Tokyo, Japan

[21] Appl. No.: 596,971

[22] Filed: Feb. 5, 1996

Related U.S. Application Data

[62] Division of Ser. No. 498,963, Jul. 6, 1995, Pat. No. 5,563,189.

[51] Int. Cl.$^6$ ............................................. C08J 3/03
[52] U.S. Cl. .......................... 523/322; 523/348; 523/324; 524/837; 524/588; 524/858; 524/860; 252/349; 252/314; 366/295
[58] Field of Search ............................ 523/322, 348, 523/324; 524/837, 588, 858, 860; 252/349, 314; 366/295

[56] References Cited

U.S. PATENT DOCUMENTS

| | | | |
|---|---|---|---|
| 3,623,703 | 11/1971 | Nielander | 259/3 |
| 4,668,717 | 5/1987 | Lemstra et al. | 523/322 |
| 4,687,339 | 8/1987 | Seeger | 366/305 |
| 4,792,238 | 12/1988 | Yoneyama et al. | 366/307 |
| 4,814,376 | 3/1989 | Tanaka et al. | 524/588 |
| 4,824,877 | 4/1989 | Glover et al. | 523/221 |

*Primary Examiner*—Margaret W. Glass
*Attorney, Agent, or Firm*—James L. DeCesare

[57] ABSTRACT

Method and apparatus for preparing uniform highly dispersed emulsions by using a low drive power and without pressurization, making possible continuous mass production of uniform organopolysiloxane emulsions. An organopolysiloxane, water and a emulsifying agent, are continuously fed across a first-stage shearing and stirring mechanism and a second-stage shearing and stirring mechanism. The first-stage mechanism is a stator and turbine-type rotor whose blades are slanted obliquely from the radial direction when viewed from the axial direction. The second-stage mechanism is a stator and turbine-type rotor whose blades describe spiral curves with respect to the axial direction. The two mechanisms are arranged serially and separated from one another by a relaxation zone. Emulsification is carried out in the first-stage mechanism by an intake and shearing action at a shear rate of at least 100/second, and in the second-stage mechanism by a phase reversal rotating effect and shearing action at a shear rate of at least 100/second.

6 Claims, 2 Drawing Sheets

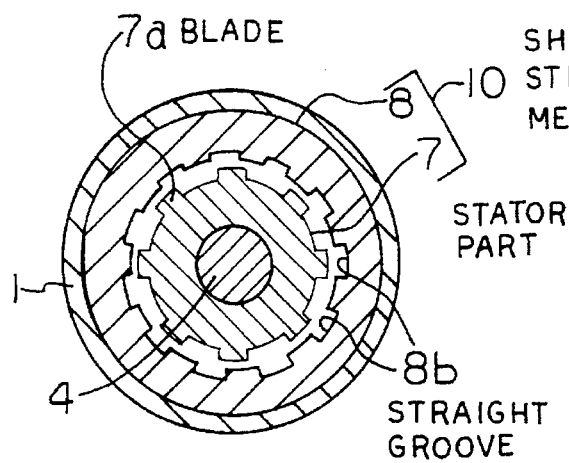
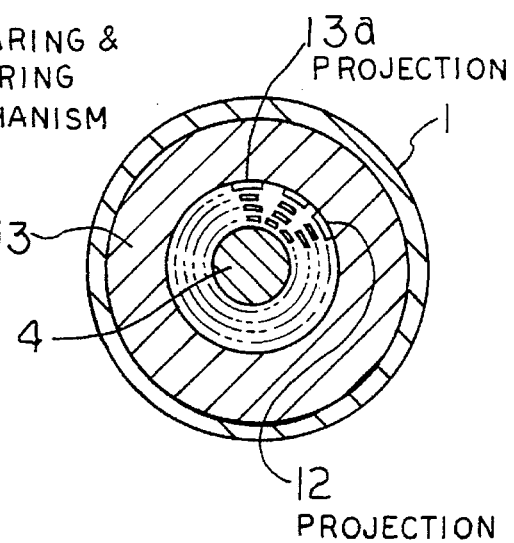
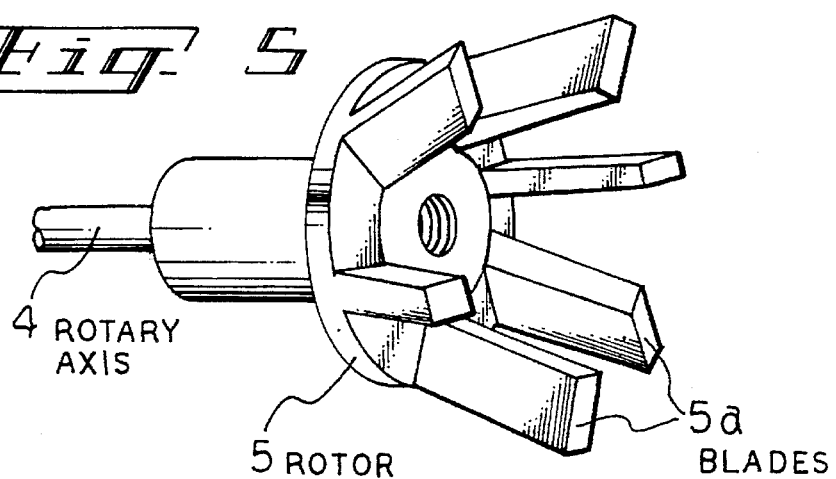

5,665,796

METHOD FOR THE CONTINUOUS PREPARATION OF ORGANOPOLYSILOXANE EMULSIONS

This is a divisional of application Ser. No. 08/498,963 filed on Jul. 6, 1995, now U.S. Pat. No. 5,563,189.

BACKGROUND OF THE INVENTION

This invention relates to a method for the continuous preparation of organopolysiloxane emulsions. More particularly, this invention relates to a highly productive method for the preparation of uniform and highly dispersed organopolysiloxane emulsions.

Organopolysiloxane emulsions are widely used in industry as lubricants, release agents, fiber-treatment agents, glass fiber-treatment agents, cosmetic bases, lustrants and paint additives.

Methods already known for the preparation of organopolysiloxane emulsions are exemplified by (a) mixing the starting liquid organopolysiloxane, emulsifying agent, and water using a mixer that applies a stirring action, for example, a Henschel mixer or kneader mixer and (b) mixing said starting materials through the application of a shearing action using a colloid mill. In addition, Japanese Patent Publication Number Sho 59-51565 [51,565/1984] teaches a method that uses a cylindrical container having therein, a stirring element comprising at least 3 disks installed at a fixed interval on a rotating axle. Diorganopolysiloxane oil, emulsifying agent and water are continuously fed in this method to the cylindrical container and are sheared and stirred by this stirring element.

However, each of these prior-art methods is poorly adaptable to the continuous mass production of uniform, highly dispersed organopolysiloxane emulsions, and each suffers from the problem of poor productivity. In the particular case of the method disclosed in Japanese Patent Publication Number Sho 59-51565, shearing and stirring must be conducted with the application of pressure in order to make a uniform emulsion, and this automatically incurs such disadvantages as increased operating costs due to the increased drive energy as well as costs associated with reinforcing the equipment structure.

SUMMARY OF THE INVENTION

The present invention takes as its object the introduction of a highly productive continuous method for the preparation of organopolysiloxane emulsions that, through the use of special shearing and stirring mechanisms, is able to provide uniform, highly dispersed emulsions without pressurization and using a low drive force, and at the same time is capable of the continuous mass production of said uniform emulsions.

These and other features and objects of the invention will become apparent from a consideration of the detailed description.

BRIEF DESCRIPTION OF THE DRAWINGS

FIG. 3 is a pictorial representation in cross-section taken along line B—B in FIG. 1 and viewed in the direction shown by the arrows.

FIG. 4 is a pictorial representation in cross-section taken along line C—C in FIG. 1 and viewed in the direction shown by the arrows.

FIG. 5 is a perspective view of rotor 5 in the first-stage shearing and stirring mechanism of the mixer apparatus in FIG. 1.

Figure 1:
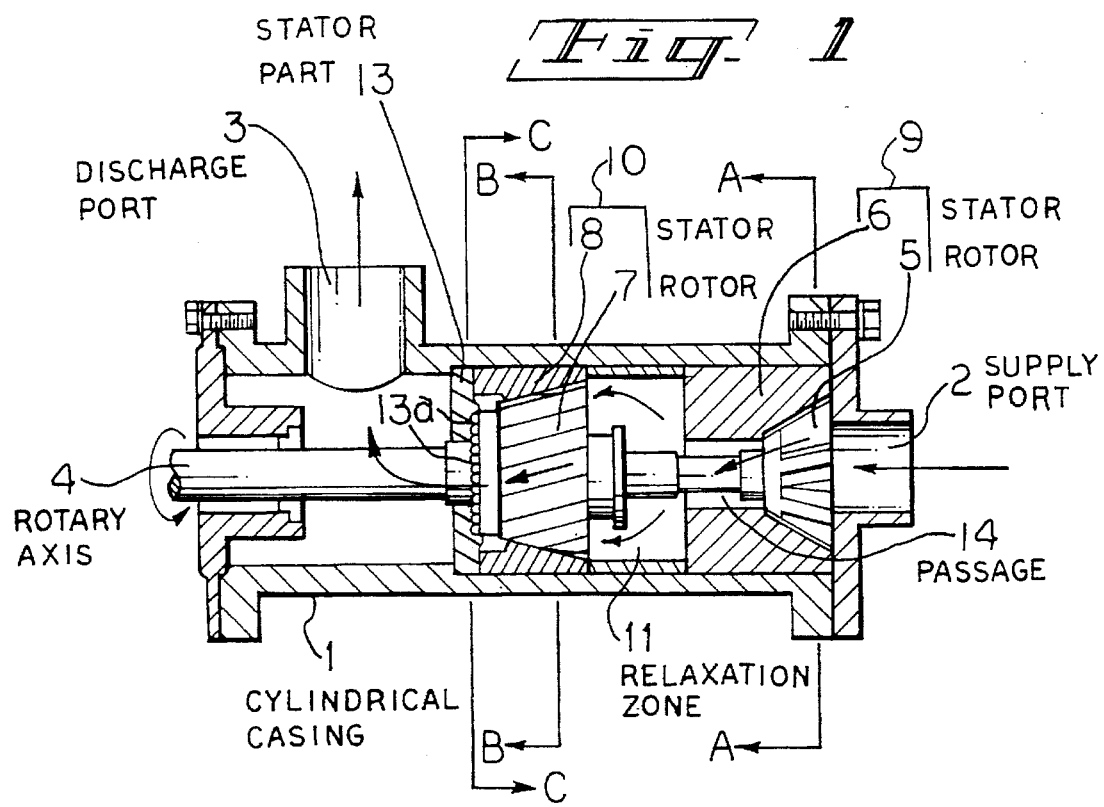
FIG. 1 is a pictorial representation partly in cross-section of a mixer apparatus for carrying out the method according to the present invention for the continuous preparation of organopolysiloxane emulsions.

In these figures, reference numbers and words are used to identify identical parts. Thus, the reference number 1 is the cylindrical casing, 2 is the supply port, 3 is the discharge port, 4 is the rotatable axis, 5 and 7 are turbine-type rotors, 5a and 7a are blades, 6 and 8 are stators, 8b is the straight grooves, 9 and 10 are shearing and stirring mechanisms, 11 is the relaxation space or zone, 12 is sawtooth-like projections, 13 is the stator element, and 13a is sawtooth-like projections.

As explained in detail below, the "shear rate" $V_s$ is expressed in standard units used in the industry as 1/second or reciprocal seconds, often also shown as sec.$^{-1}$ or sec. power$^{-1}$.

DETAILED DESCRIPTION OF THE INVENTION

The method according to the present invention for the continuous preparation of organopolysiloxane emulsions, which achieves the aforesaid object, characteristically comprises the continuous supply of starting organopolysiloxane liquid or gum, water and emulsifying agent into the supply port of a cylindrical casing in which there are installed between the supply port and discharge port of said cylindrical casing at least a first-stage shearing and stirring mechanism and a second-stage shearing and stirring mechanism, wherein said first-stage shearing and stirring mechanism is composed of a turbine-type rotor having blades that are slanted obliquely from the radial direction when viewed from the axial direction and a stator installed about the circumference of said rotor and said second-stage shearing and stirring mechanism is composed of a turbine-type rotor having blades that describe spiral curves with respect to the axial direction and a stator installed about the circumference of said rotor.

These mechanisms are arranged serially along the direction of starting material feed and are separated from one another by a relaxation zone; thereby subjecting said starting materials in the aforesaid first-stage shearing and stirring mechanism principally to an intake action and a shearing action at a shear rate of at least 100/second. It is then passed through the relaxation zone in the second-stage shearing and stirring mechanism principally to a phase reversal and a rotating effect and a shearing action at a shear rate of at least 100/second. Thereafter, an organopolysiloxane-in-water or a water-in-organopolysiloxane emulsion is discharged from the discharge port.

As described above, the starting materials are subjected to an intake action and a shearing action at a shear rate of at least 100/second due to the particular structure of the first-stage shearing and stirring mechanism (hereinafter abbreviated as SSM) comprising a turbine-type rotor having blades that are slanted obliquely from the radial direction when viewed from the axial direction and a stator installed about the circumference of said rotor. Due to the particular structure of the second-stage SSM comprising a spiral blade-equipped turbine-type rotor and a stator, this stage subjects the mixture to a strong shearing action at a shear rate of at least 100/second between the stator and the spiral blades of the turbine-type rotor. At the same time, the mixture is also impacted against the side surfaces of the spiral blades slanted with respect to the rotational axis, which results in strong reversal and rotation effects that forcibly alter the phase into the radial and circumferential directions. Emulsification proceeds through a synergetic interaction among these actions and effects, Emulsification is further advanced by repetition of the above-described emulsifying effects over at least two stages with a relaxation zone interposed between successive serially connected SSMs. The overall result is the production of a uniform, highly dispersed emulsion.

The "shear rate" $V_s$ (1/second) in the present invention is the value given by the following equation $$V_s(1/sec)=V/C$$

in which V is the peripheral velocity of the turbine-type rotor in cm/second and C is the gap in centimeters between the inner surface of the stator and the peripheral surface of the rotor moving at peripheral velocity V.

In FIG. 1, 1 denotes a cylindrical casing whose axial direction is horizontal. One end of this casing is equipped with a starting material supply port 2, while the other end is equipped with a discharge port 3 for the emulsified mixture. A rotatable axle 4 is inserted at the center of the cylindrical casing 1. In the figure, the rotatable axle 4 is inserted from the left end of the cylindrical casing 1 and extends to the vicinity of the supply port 2 on the right end. It is driven by a motor (not shown) that sits outside the casing.

The rotatable axle 4 is equipped with a rotor 5 at its end at the supply port 2 and with a rotor 7 at its middle. Stators 6 and 8, which are fixed in the inner peripheral wall of the cylindrical casing 1, are installed surrounding the circumferences of the rotors 5 and 7, respectively, and in each case separated therefrom by a small gap. The rotor 5 and the stator 6 make up the first-stage shearing and stirring mechanism 9, while the rotor 7 and the stator 8 make up the second-stage shearing and stirring mechanism 10. In addition, a relaxation space 11 comprising a relatively large volume is installed between the first-stage SSM 9 and the second-stage SSM 10.

Figure 2:
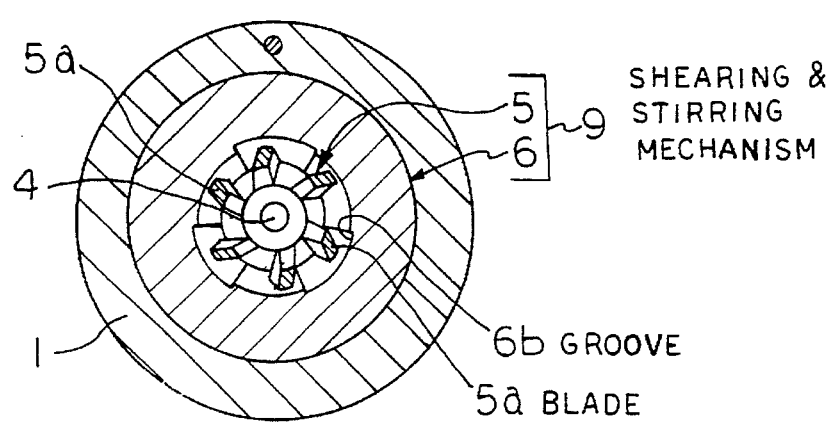
FIG. 2 is a pictorial representation in cross-section taken along line A—A in FIG. 1 and viewed in the direction shown by the arrows.

The rotor 5 in the first-stage SSM 9 is a turbine-type rotor, from which a plural number of blades 5a radiate out in a cone-like manner toward the supply port 2 as seen in FIGS. 2 and 5. These blades 5a are substantially parallel to the axial direction in plane view, but are slanted relative to the axial direction in side view and are obliquely slanted with respect to the radial direction when viewed from the axial direction.

The stator 6 in the SSM 9 forms a near-conical interior peripheral surface that contains grooves 6b that extend in the axial direction. The rotor 5 is inserted into the conical stator 6 with the formation of a narrow gap with the peripheral edges of the blades 5a. The minimum gap size is 2 mm or less and is preferably 1 mm or less (see FIG. 2).

The rotor 7 in the second-stage SSM 10 is also a turbine-type rotor, but unlike the SSM 9, the blades 7a describe a spiral with reference to the axial direction. The blades 7a are shorter in the radial direction than the blades 5a of the rotor 5 of the SSM 9 (see FIG. 3).

The stator 8 of the SSM 10 has a near-conical shape, and its interior peripheral surface contains a plural number of straight grooves 8b that extend in the axial direction. The rotor 7 is inserted into the stator 8 with the formation of a small gap with the outer surfaces of the spiral blades 7a. This gap becomes progressively narrower in a wedge-like manner moving from the upstream side to the downstream side, as shown in FIG. 1. The minimum gap size is 2 mm or less and is preferably 1 mm or less.

A large number of rearward projecting sawtooth-like projections 12 are installed on the downstreams end surface, that is, the surface perpendicular to the axial direction of the rotor 7 of the second-stage SSM 10. These projections 12 are set up so as to alternate, moving radially, with a large number of sawtooth-like projections 13a fixed on the stator element 13, but a narrow gap remains interposed between the projections 12 and the projections 13a. These projections 12 and 13a are deployed in a spirally curved regime radiating outward along the radial direction (see FIGS. 1 and 4).

According to our method for continuous preparation of organopolysiloxane emulsions, the three starting materials organopolysiloxane liquid or gum, emulsifying agent and water, are supplied to the supply port 2 of the mixing device in which there are serially installed at least the above-described first-stage shearing and stirring mechanism 9 and the above-described second-stage shearing and stirring mechanism 10. These starting materials may be supplied separately or may be supplied in the form of a preliminarily prepared mixture.

The first-stage SSM 9 exercises an intake action and also an initial emulsifying action on the starting materials. Said intake action is exercised mainly through the outward radiating execution of the blades 5a on the rotor 5 in such a manner that they are obliquely slanted with reference to the radial direction when viewed from the axial direction. The initial emulsifying action occurs through a microparticulation and emulsification resulting from the shearing and cutting action applied to the three starting materials between the outer peripheral surface of the blades 5a and the inner wall of the stator 6. This shearing action should apply shear at a shear rate of at least 100/second.

After its initial emulsification by the first-stage SSM 9, the mixture is squeezed into the flow passage 14, then fed into the relaxation space 11, where it is released from its compressed state, and thereafter is supplied to the second-stage shearing and stirring mechanism 10.

In this second-stage SSM 10, a coarse grinding action is exercised by the stator 8 and the spiral blades 7a of the rotor 7, while a fine grinding action is developed by the shearing action generated by the intermeshing between the sawtooth-like projections 12 on the downstream end surface of the rotor 7 and the sawtooth-like projections 13a on the stator element 13.

Upon introduction into the space circumscribed by the blades 7a of the rotor 7 and the inner wall of the stator 8, the mixture is subjected to phase reversing and rotating effects due to the action of the blades 7a which are diagonally curved in the axial direction. This functions to alter the phase into the radial and circumferential directions. An even finer and more uniform emulsification is obtained because the mixture, while being subjected to these reversing and rotating effects, is at the same time also subjected to a shearing and cutting action between the peripheral surfaces of the blades 7a and the inner wall of the stator 8 equipped with a plural number of straight grooves 8b. As before, this shearing action should apply shear at a shear rate of at least 100/second.

The resulting emulsified mixture becomes even more finely emulsified in the downstream fine grinding region between the sawtooth-like projections 12 and 13a, thus finally yielding a highly dispersed and uniform organopolysiloxane emulsion. The emulsion is discharged from the discharge port 3 in the cylindrical casing 1.

Continuous production of organopolysiloxane emulsions can be accomplished using separate feeds of starting organopolysiloxane, emulsifying agent and water to the starting material supply port, or by preliminarily mixing these starting materials and supplying this mixture to the starting material supply port.

The organopolysiloxane preferably has a viscosity at 25° C. of at least 10,000 centistokes. When the viscosity of the organopolysiloxane is too high, it may be dissolved in a solvent.

An even more uniform and stable emulsion is obtained when the shearing and stirring processes are run while bubbling in an inert gas such as air or nitrogen. This makes possible a reduction in the pressure within the mixer and a reduction in the power consumption for stirring. The gas is preferably injected at the starting material supply port.

It is important to the present invention that there are serially installed at least the first-stage shearing and stirring mechanism composed of a stator and the turbine-type rotor whose blades are slanted obliquely from the radial direction when viewed from the axial direction, and the second-stage shearing and stirring mechanism composed of a stator and the turbine-type rotor whose blades describe spiral curves with respect to the axial direction. This two-stage serial combination may serially connected a plural number of times in order to obtain ever finer emulsifications.

An extremely minute emulsification is achieved by the two-stage combination. But in addition, the configuration of a front stage comprising the first-stage SSM that implements primarily starting material intake and shearing activities, and a rear stage comprising the second-stage SSM that implements primarily reversing and rotation activities simultaneously with a shearing activity, makes possible mixture emulsification at low pressures using a low drive power. This is further strengthened by the presence of a sufficiently large relaxation zone between the first-stage and second-stage SSMs.

A shear rate of at least 100/second but preferably of 10,000 to 300,000/second should be applied to the mixture between the stator and turbine-type rotor in each shearing and stirring mechanism. A highly dispersed and uniform emulsion cannot be obtained when a shear rate below 100/second is applied.

With regard to shearing and stirring from the second stage on, emulsification is preferably run by implementing a first shearing episode as coarse grinding to carry out a coarse emulsification, and by implementing a second shearing episode as fine grinding to carry out a minute attrition.

In addition to subjecting the mixture to high shear rates, the continuous preparative method according to the present invention also applies a strong reversing activity through the action of the spiral blades on the turbine-type rotor. This reversing constantly alters the phase of the mixture into the radial and circumferential directions, and the synergy between this and the shearing makes possible a much more efficient conversion of the mixture into a uniform emulsion.

The present invention may be used with any organopolysiloxane that is a liquid or gum at ambient temperature. Compounds with the following formula are examples of the organopolysiloxane:

Wherein R represents substituted and unsubstituted monovalent hydrocarbon groups. Exemplary groups are alkyl groups such as methyl, ethyl and propyl; aryl groups such as phenyl, and tolyl; and alkyl or aryl groups in which all or part of the carbon-bonded hydrogen has been substituted by halogen, such as chloromethyl and 3,3,3-trifluoropropyl. The subscript a in the formula has a value of 1.9 to 2.1.

Organopolysiloxanes are exemplified by trimethylsiloxy-endblocked dimethylpolysiloxanes, silanol-endblocked dimethylpolysiloxanes, trimethylsiloxy-endblocked dimethylsiloxane-methylphenylsiloxane copolymers, silanol-endblocked dimethylsiloxane-methylphenylsiloxane copolymers, trimethylsiloxy-endblocked dimethylsiloxane-diphenylsiloxane copolymers, silanol-endblocked dimethylsiloxane-diphenylsiloxane copolymers, trimethylsiloxy-endblocked dimethylsiloxane-methyl(3,3,3-trifluoropropyl)siloxane copolymers and silanol-endblocked dimethylsiloxane-methyl(3,3,3-trifluoropropyl)siloxane copolymers.

The molecular structure of the organopolysiloxane may be straight chain, partially branched straight chain and network, but straight-chain organopolysiloxanes are preferred.

The water component B may be tap water, or ion-exchanged water. The water is preferably used at 1 to 400 weight parts per 100 weight parts organopolysiloxane component A.

Nonionic surfactants, anionic surfactants, and cationic surfactants may be used as emulsifying agent component C. The nonionic surfactants are exemplified by polyoxyalkylene alkyl ethers, polyoxyalkylene alkylphenol ethers, polyoxyalkylene alkyl esters, polyoxyalkylene sorbitan alkyl esters, polypropylene glycol and diethylene glycol. The anionic surfactants are exemplified by fatty acid salts such as sodium laurate, sodium stearate, sodium oleate and sodium linolenate; by alkylbenzenesulfonic acids such as hexylbenzenesulfonic acid, octylbenzenesulfonic acid, and dodecylbenzenesulfonic acid, and by salts of the preceding; and by alkylsulfonates, and sodium polyoxyethylene alkylphenyl ether sulfate. The cationic surfactants are exemplified by octyltrimethylammonium hydroxide, dodecyltrimethylammonium hydroxide, alkyltrimethylammonium chlorides and benzylammonium salts. Two or more of these surfactants may be used in combination.

Nonionic and cationic surfactants are preferred for the present invention. This component should be added in sufficient quantity to emulsify water component B in organopolysiloxane component A or the organopolysiloxane component A in the water. The preferred surfactant addition ranges from 0.1 to 100 weight parts per 100 weight parts organopolysiloxane component A.

Organopolysiloxane emulsions yielded by the present invention consist of emulsions in which the organopolysiloxane is emulsified and dispersed in water. However, emulsions in which water is emulsified and dispersed in the organopolysiloxane can be prepared by adjusting the amount of water component B relative to emulsifying agent component C.

The organopolysiloxane emulsions of the present invention have an average particle size in the range from 0.1 to 50 micrometers.

The organopolysiloxane emulsions may be used without further modification or may be diluted with water. The emulsions can be used as fiber-treatment agents, lubricants, release agents, glass fiber-treatment agents, oil bases for cosmetics, lustrants, defoamers and paint additives.

The following examples illustrate our invention in more detail.

EXAMPLE 1

This example used a mixer in accordance with FIG. 1. There were continuously fed into the supply port 1 100 weight parts trimethylsiloxy-endblocked dimethylpolysiloxane with a viscosity at 25° C. of 60,000 centistokes, 9.0 weight parts polyoxyethylene lauryl ether, 3.4 weight parts cetyltrimethylammonium chloride and 3.6 weight parts ion-changed water. Processing by shearing and stirring to homogeneity yielded a dimethylpolysiloxane emulsion.

In this example, the rotation rate of the rotatable axis 4 in the mixer was 4,200 rpm; the minimum gap was 0.2 mm in both the first-stage shearing and stirring mechanism 9 and the second-stage shearing and stirring mechanism 10; the shear rate in the first-stage shearing and stirring mechanism 9 was 93,000/second; the shear rate in the second-stage shearing and stirring mechanism 10 was 70,000/second; the pressure at the starting material supply port 2 was 0.4 kg/cm² G; and the emulsion discharge pressure at the discharge port 3 was 0.0 kg/cm² G.

The resulting dimethylpolysiloxane emulsion was a translucent paste emulsion in which the dimethylpolysiloxane was emulsified and dispersed to homogeneity in water. An average particle size of 0.4 micrometers was measured for the dimethylpolysiloxane emulsion. The average particle size of this paste emulsion was measured using a laser light scattering instrument for measuring particle size distributions. Measurement was carried out on the paste emulsion after dilution with water.

EXAMPLE 2

This example used two of the mixers shown in FIG. 1 connected in series. The following were continuously fed to the starting material supply port of the first mixer: 10.0 weight parts polyoxyethylene lauryl ether, 5.0 weight parts ion-exchanged water, and 100 weight parts of a mixture with a viscosity at 25° C. of 100,000 centistokes prepared by the homogeneous dissolution of 42 weight parts trimethylsiloxy-endblocked dimethylpolysiloxane gum in 58 weight parts isoparaffin. The isoparaffin had a specific gravity of 0.79, and a viscosity at 40° C. of 2.4 centistokes. The flow from the first mixer was continuously fed into the second mixer. The materials were processed by shearing and stirring to homogeneity to yield a dimethylpolysiloxane emulsion.

The following process parameters were used for both mixers: rotation rate of the rotatable axle 4 was 3,000 rpm, minimum gap in both the first-stage shearing and stirring mechanism 9 and the second-stage shearing and stirring mechanism 10 was 0.2 mm, shear rate in the first-stage shearing and stirring mechanism 9 was 66,000/second, and shear rate in the second-stage shearing and stirring mechanism 10 was 50,000/second. The pressure at the supply port 2 of the first mixer was 0.1 kg/cm² G; the pressure at the discharge port 3 of the first mixer and at the supply port 2 of the second mixer was 0.0 kg/cm2 G; and the discharge pressure at the discharge port 3 of the second mixer was also 0.0 kg/cm² G.

This dimethylpolysiloxane emulsion was a translucent paste emulsion in which the dimethylpolysiloxane gum was emulsified and dispersed to homogeneity in water. An average particle size of 0.4 micrometers was measured for the dimethylpolysiloxane emulsion.

The continuous preparative method according to the present invention, through the use of special shearing and stirring mechanisms, is able to continuously produce uniform and highly dispersed organopolysiloxane emulsions, and is able to do so using a low drive power and without pressurization. Moreover, due to its continuous feature, this method is a highly productive method for preparing organopolysiloxane emulsions.

Other variations and modifications may be made in compounds, compositions, apparatus, and methods described without departing from the essential features of the invention. The forms of the invention are only exemplary and not intended as limitations on the scope of the invention defined in the claims.

That which is claimed is:

1. Apparatus for preparing organopolysiloxane emulsions comprising means for continuously feeding and supplying organopolysiloxane liquid or gums, water and emulsifying agents, including a cylindrical casing having a supply port and a discharge port, the cylindrical casing having mounted therein between its supply and discharge ports a first-stage shearing and stirring mechanism and a second-stage shearing and stirring mechanism, the first-stage shearing and stirring mechanism comprising a turbine rotor having blades slanted obliquely from the radial direction when viewed in the axial direction, and a stator arranged about the circumference of the rotor, the second-stage shearing and stirring mechanism comprising a turbine rotor having blades describing spiral curves with respect to the axial direction, and a stator arranged about the circumference of its rotor, the first and second-stage mechanisms being arranged serially along the direction of flow of fed materials and being separated one from another by a relaxation zone; means for subjecting the fed materials in the first-stage shearing and stirring mechanism to an intake and shearing action at a shear rate of at least 100 reciprocal seconds; and after passage through the relaxation zone, means for subjecting the materials in the second-stage shearing and stirring mechanism to phase reversal, rotational effects, and shearing action, at a shear rate of at least 100 reciprocal seconds; whereby an organopolysiloxane-in-water or water-in-organopolysiloxane emulsion is discharged from the discharge port of the cylindrical casing.

2. Apparatus according to claim 1 in which a downstream surface of the turbine rotor in the second-stage shearing and stirring mechanism has sawtooth projections, the second-stage shearing and stirring mechanism including an intervening gap, followed by sawtooth projections on an upstream surface of the stator of the second-stage shearing and stirring mechanism, the two sets of sawtooth projections on surfaces of the rotor and stator of the second-stage mechanism intermeshing with one another.

3. Apparatus according to claim 1 in which there is provided a minimum gap of less than 2 mm inclusive between turbine rotors and stators of the mechanisms.

4. Apparatus according to claim 1 in which shear rates in the first and second-stage shearing and stirring mechanisms are between 10,000–300,000 reciprocal seconds.

5. Apparatus according to claim 1 in which the first and second-stage shearing and stirring mechanisms are serially connected to third and fourth-stage shearing and stirring mechanisms of the same construction as the first and second-stage shearing and stirring mechanisms.

6. Apparatus according to claim 1 in which shear rates $V_S$ correspond to values defined by the equation $V_S$ (1/sec)= V/C where V is the peripheral velocity of turbine rotors in cm/second and C is the gap in centimeters between the inner surface of a stator and the peripheral surface of its rotor moving at peripheral velocity V.

* * * * *